United States Patent
Pierpont et al.

(10) Patent No.: US 8,288,059 B2
(45) Date of Patent: Oct. 16, 2012

(54) PROCESSING METHODS AND SYSTEMS FOR ASSEMBLING FUEL CELL PERIMETER GASKETS

(75) Inventors: Daniel M. Pierpont, North Saint Paul, MN (US); Eric J. Hanson, Hudson, WI (US); Michael T. Hicks, Eden Prairie, MN (US); Eric J. Iverson, Eau Claire, WI (US); David J. Miller, Menomonie, WI (US); Scott A. Ripley, River Falls, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 1705 days.

(21) Appl. No.: 11/611,575

(22) Filed: Dec. 15, 2006

(65) Prior Publication Data

US 2008/0145712 A1 Jun. 19, 2008

(51) Int. Cl.
*H01M 8/00* (2006.01)
*H01M 8/02* (2006.01)
*H01M 8/10* (2006.01)

(52) U.S. Cl. ......... 429/535; 429/479; 429/507; 427/115

(58) Field of Classification Search .................. 429/400, 429/479–497, 507–511, 535; 29/623.1–623.4; 502/101; 427/115
See application file for complete search history.

(56) References Cited

U.S. PATENT DOCUMENTS

| | | | |
|---|---|---|---|
| 4,812,352 A | 3/1989 | Debe | |
| 5,879,827 A | 3/1999 | Debe et al. | |
| 6,136,412 A | 10/2000 | Spiewak et al. | |
| 6,291,091 B1 * | 9/2001 | Preischl et al. | 429/535 |
| 6,454,978 B1 * | 9/2002 | Thielman | 264/104 |
| 7,195,690 B2 | 3/2007 | Mekala et al. | |
| 7,504,173 B2 | 3/2009 | Kuroki et al. | |
| 7,732,083 B2 * | 6/2010 | Steinbach et al. | 29/623.4 |
| 2003/0003342 A1 * | 1/2003 | Sugita et al. | 429/35 |
| 2003/0008194 A1 | 1/2003 | Cargneli et al. | |

(Continued)

FOREIGN PATENT DOCUMENTS

EP 1 624 512 A2 2/2006

(Continued)

OTHER PUBLICATIONS

U.S. Appl. No. 11/224,879, filed Sep. 13, 2005, now pending, Titled: "Multilayered Nanostructured Films".

*Primary Examiner* — Basia Ridley
*Assistant Examiner* — Jacob Buchanan
(74) *Attorney, Agent, or Firm* — Julie A. Lapos-Kuchar; Philip Y. Dahl

(57) ABSTRACT

A method and apparatus for making fuel cell components via a roll to roll process are described. Spaced apart apertures are cut in first and second gasket webs that each include adhesives. The first and second gasket webs are transported to a bonding station on conveyers. A membrane web that includes at least an electrolyte membrane is also transported to the bonding station. At the bonding station, a gasketed membrane web is formed by attaching the first and second gasket webs to the membrane web. The first gasket web is attached to a first surface of the membrane web via the adhesive layer of the first gasket web. The second gasket web is attached to a second surface of the membrane web via the adhesive layer of the second gasket web.

25 Claims, 9 Drawing Sheets

U.S. PATENT DOCUMENTS

| | | |
|---|---|---|
| 2003/0082430 A1 | 5/2003 | Suzuki |
| 2003/0191021 A1* | 10/2003 | Ripley et al. .................. 502/439 |
| 2003/0221311 A1 | 12/2003 | Smith et al. |
| 2004/0115513 A1 | 6/2004 | Yang |
| 2004/0220048 A1* | 11/2004 | Leban ........................... 502/101 |
| 2004/0241525 A1 | 12/2004 | Mekala et al. |
| 2005/0095490 A1 | 5/2005 | Mittelstadt et al. |
| 2005/0118491 A1 | 6/2005 | Ramsey et al. |
| 2005/0236765 A1* | 10/2005 | Puffer et al. .................. 271/307 |
| 2006/0048540 A1 | 3/2006 | Voss et al. |
| 2006/0110647 A1 | 5/2006 | Sherman et al. |
| 2006/0127738 A1 | 6/2006 | Sompalli et al. |
| 2006/0141328 A1 | 6/2006 | Johnston et al. |
| 2006/0263558 A1 | 11/2006 | Crum |
| 2007/0059452 A1 | 3/2007 | Debe et al. |

FOREIGN PATENT DOCUMENTS

| | | |
|---|---|---|
| KR | 2006/0000461 | 6/2006 |
| WO | WO 96/19015 | 6/1996 |
| WO | WO 00/10216 * | 2/2000 |
| WO | WO 2006/075867 A1 | 7/2006 |

* cited by examiner

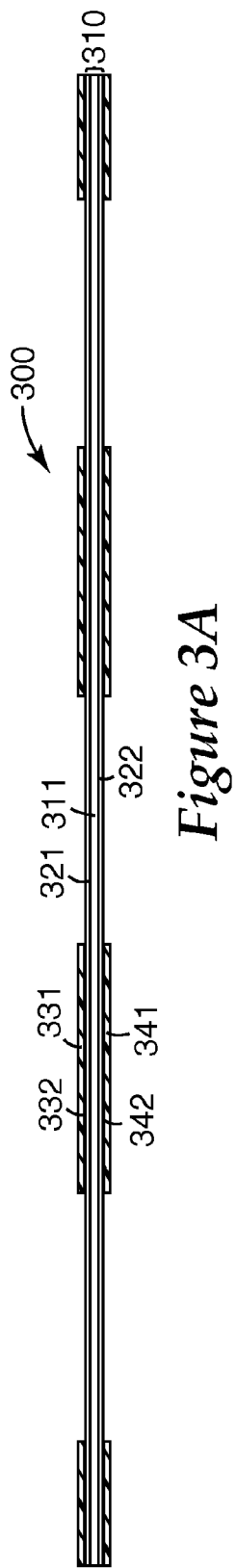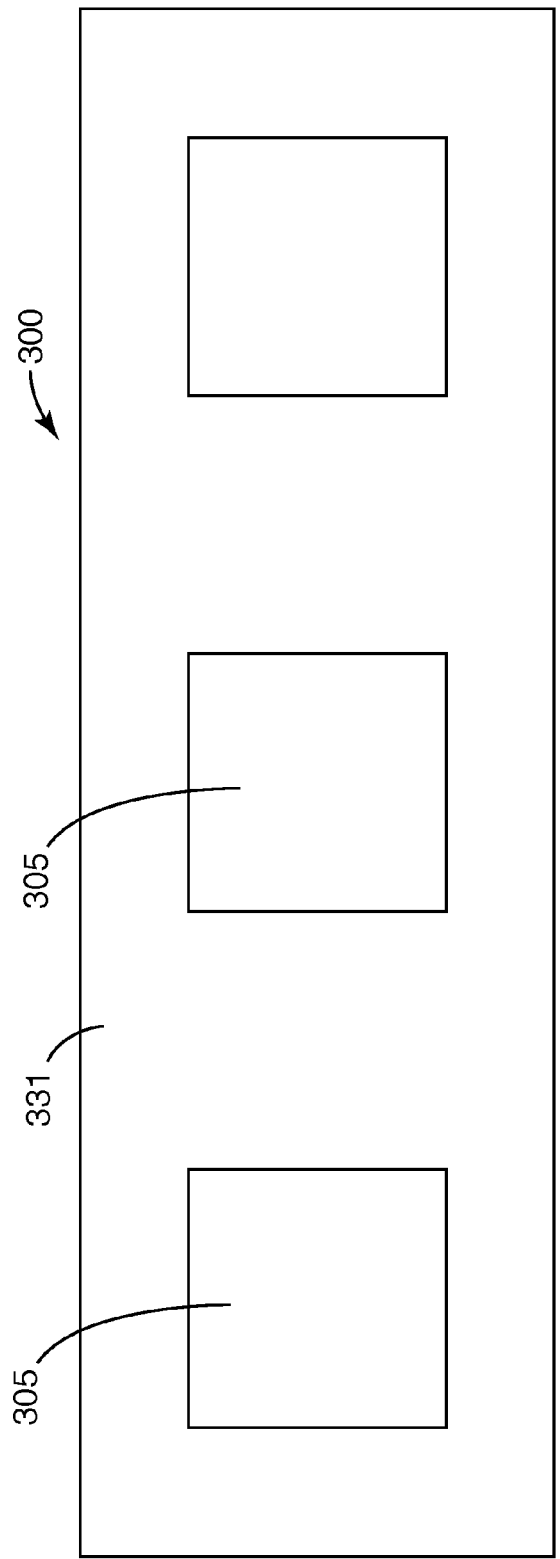

PROCESSING METHODS AND SYSTEMS FOR ASSEMBLING FUEL CELL PERIMETER GASKETS

FIELD OF THE INVENTION

The present invention relates generally to processes and apparatuses for automated fabrication of multiple layer fuel cell subassemblies including perimeter gaskets.

BACKGROUND OF THE INVENTION

A typical fuel cell power system includes a power section in which one or more stacks of fuel cells are provided. The efficacy of the fuel cell power system depends in large part on the integrity of the various contacting and sealing interfaces within individual fuel cells and between adjacent fuel cells of the stack.

To achieve the power needed for some implementations, a fuel cell stack can include large numbers of membrane electrode assemblies (MEAs), flow field plates, and sealing gaskets. These and other components of the stack must be carefully aligned and assembled. Misalignment of even a few components can lead to gas leakage, hydrogen crossover, and performance/durability deterioration.

Conventional fuel cell assembling approaches typically involve cutting several of the input web components to form stacks of such material in batch operations. The components are then manipulated using various mechanical and vacuum means to properly position the components during fuel cell assembly.

Although many of these processes can be automated, such approaches typically involve numerous handling, registration, and alignment steps performed by complex, time consuming, and typically expensive automation equipment. The number and complexity of processing steps associated with conventional fuel cell manufacturing approaches typically reduces product throughput, which negatively affects the productivity of an automated fuel cell assembly line. Moreover, many conventional fuel cell fabrication apparatuses and methods are not well suited for a high degree of automation, particularly such apparatus and processes which have tight positional tolerance requirements.

There is a need for improved fuel cell manufacturing apparatuses, methodologies, and fuel cell subassemblies produced from such apparatuses and methodologies. There is a further need for such apparatuses, methodologies, and fuel cell subassemblies that can be implemented in an automated assembly environment, such as in an automated fuel cell assembly plant. The present invention fulfills these and other needs, and addresses other deficiencies in prior approaches.

SUMMARY OF THE INVENTION

Embodiments of the invention are directed to fuel cell fabrication processes, equipment and fuel cell subassemblies. Various embodiments exemplify automated fabrication of multiple layer fuel cell subassemblies in roll-good form, including gasketed electrolyte membranes, gasketed catalyst coated membranes (CCMs) and/or gasketed membrane electrode assemblies (MEAs) in roll-good form.

One embodiment of the invention is directed to a method of making fuel cell components via a roll to roll process. Spaced apart apertures are cut in first and second gasket webs which include adhesive layers. The first and second gasket webs are transported to a bonding station on conveyers. A membrane web that includes at least an electrolyte membrane is also transported to the bonding station. At the bonding station, a gasketed membrane web is formed by attaching the first and second gasket webs to the membrane web. The first gasket web is attached to a first surface of the membrane web via the adhesive layer of the first gasket web. The second gasket web is attached to a second surface of the membrane web via the adhesive layer of the second gasket web.

One or both of the first and second conveyers transporting the first and second gasket webs may comprise a vacuum conveyor, a roller, or a carrier web, for example. The bonding station may include one or more pairs of cylindrical bonding rollers.

In some implementations, the first and second gasket webs are attached to the membrane web substantially concurrently. In other implementations, the first gasket web is attached to the membrane web before the second gasket web is attached to the membrane. Catalyst layers may be placed on the membrane web before or after attaching the first and second gasket webs to the membrane web.

According to one configuration, the electrolyte membrane is a catalyst coated electrolyte membrane (CCM) and the first and second gasket webs are attached to the CCM.

Further processes may involve attaching gas diffusion layers over active areas of the gasketed membrane web. In some implementations, first gas diffusion layers are disposed within apertures of the first gasket layer and second gas diffusion layers are disposed within apertures of the second gasket layer. In other implementations, the gas diffusion layers may overlap the first and/or second gasket layer. The gas diffusion layers may include catalyst layers.

In some configurations, the adhesives of the first and/or second gasket webs may have adhesive liners that are removed prior to attaching the first and second gasket webs to the membrane web at the bonding station.

In some configurations, the electrolyte membrane and/or catalyst is "thrifted," so that the electrolyte membrane or catalyst does not extend all the way to the edges of the first and second gasket webs. In one implementation, the electrolyte membrane and/or catalyst is thrifted in a cross web direction.

According to one aspect of the invention, the adhesive of the first and/or second gasket layers may include a pressure sensitive adhesive. The first and/or second gasket webs may be attached to the membrane web via the pressure sensitive adhesive of the first and/or second gasket layers using bonding rollers operating at room temperature.

According to another aspect of the invention, the adhesive of the first and/or second gasket layers includes a heat activated adhesive. The first and/or second gasket webs may be attached to the membrane web via the heat activated adhesive of the first and/or second gasket layers using heated bonding rollers.

According to yet another aspect of the invention, the adhesive of the first and/or second gasket layers comprises a UV curable adhesive. The first and/or second gasket webs may be attached to the membrane web via the UV-curable adhesive of the first and/or second gasket layers.

Another embodiment of the invention is directed to an apparatus for fabricating fuel cell components. A first cutting station cuts spaced apart apertures in a first gasket web. The first gasket web includes a first gasket layer having an adhesive. A second cutting station cuts spaced apart apertures in a second gasket web. The second gasket web includes a second gasket layer having an adhesive. A transport mechanism transports and supports the first gasket web, the second gasket web, and a membrane web including at least an electrolyte membrane. At a bonding station, the first gasket web, the second gasket web, and the membrane web are brought together by the transport mechanism. The bonding station is configured to attach the first gasket web and the second gasket web, respectively, to first and second surfaces of the membrane web via the adhesives of the first and second gasket webs.

For example, the bonding station may include bonding rollers configured to attach the first gasket web to the first surface of the membrane web and to attach the second gasket web to the second surface of the membrane web substantially concurrently. In another example, first bonding rollers are used to attach the first gasket web to the first surface of the membrane web and second bonding rollers are used to attach the second gasket web to the second surface of the membrane web. The membrane web may be uncoated or may include catalyst coatings.

The apparatus may also include a mechanism configured to attach gas diffusion layers over exposed active areas of the membrane web. The exposed active areas of the membrane web are framed by the first and second gasket layers. The gas diffusion layers may include catalyst layers.

The apparatus may also include mechanisms configured to remove adhesive liners of the adhesives of each of the first and second gasket layers prior to bringing the first gasket web, the second gasket web, and the membrane web together at the bonding station. For example, the mechanisms may comprise peel bars or idlers.

According to some implementations, at least one of the first gasket web, the second gasket web and the membrane web is transported on a releasable adhesive carrier web. The cutting stations may include a rotary die cutter, a laser cutter, or a die press, for example.

In various configurations, the first gasket web may have a different thickness from the second gasket web and/or may comprises a different material from the second gasket web.

Yet another embodiment of the invention is directed to a fuel cell subassembly. The subassembly includes a membrane comprising first and second surfaces with a first catalyst layer disposed on the first surface of the membrane web and a second catalyst layer disposed on the second surface of the membrane. A first gasket including a gasket layer and an adhesive attached via the adhesive of the first gasket to the first surface of the membrane. One or more apertures in the first gasket expose one or more active areas of the first catalyst layer. A second gasket including a gasket layer and an adhesive is attached via the adhesive of the second gasket to the second surface of the membrane. One or more apertures in the second gasket expose one or more active areas of the second catalyst layer.

In one configuration, the first and/or second gaskets may overlap the first and second catalyst layers, respectively. In one configuration, one or more first gas diffusion layers may be disposed over the one or more active areas of the first catalyst layer and overlap at least a portion of the first gasket. One or more second gas diffusion layers may be disposed over the one or more active areas of the second catalyst layer and overlap at least a portion of the second gasket.

In another configuration, one or more first gas diffusion layers may be disposed over the one or more active areas of the first catalyst layer within apertures of the first gasket. One or more second gas diffusion layers may be disposed over the one or more active areas of the second catalyst layer within apertures of the second gasket.

The gasket layers may be attached together via their respective adhesives.

The membrane web may or may not extend to outside edges of the first and second gasket webs in a cross web direction. The first and/or catalyst layers may or may not extend to edges of the first and/or second gaskets in all directions.

Another embodiment of the invention is directed to a method of making a half gasketed membrane web in a roll to roll process. Spaced apart apertures are cut in a gasket web, the gasket web comprising a gasket layer having an adhesive. The gasket web having the spaced apart apertures is transported to a bonding station. A membrane, which may or may not include a continuous catalyst layer or patterned catalyst regions is transported to the bonding station. At the bonding station, the gasket web is bonded to a surface of the membrane web via the adhesive of the gasket layer.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIGS. 3A and 3B are cross sectional and plan views, respectively, of a gasketed CCM web in accordance with one embodiment;

Figure 1:
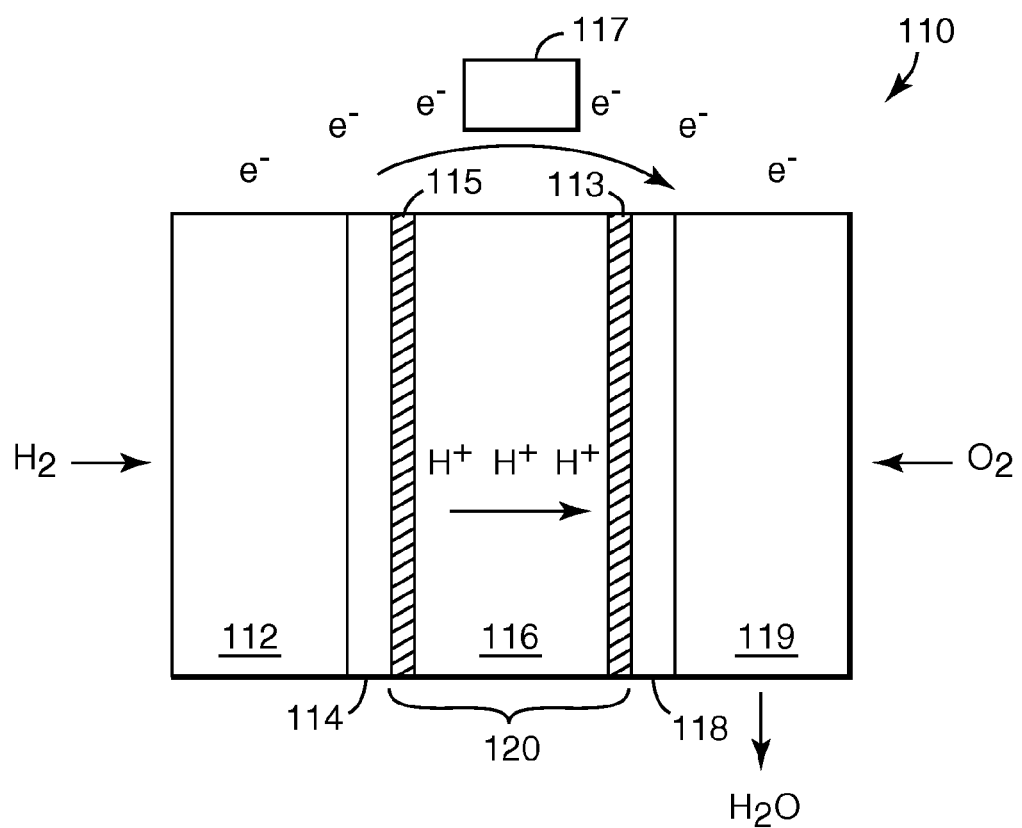
FIG. 1 depicts a typical fuel cell and its basic operation.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

Embodiments of the invention are directed to fuel cell subassemblies, and methods and apparatuses for constructing the fuel cell subassemblies. In various embodiments, a gasketed electrolyte membrane web is formed as a roll good. Roll good gasketed membrane webs may be subsequently used to fabricate roll good membrane electrode assemblies (MEAs) that may in turn be combined with flow field plates and other components to produce complete fuel cells.

A fuel cell is an electrochemical device that combines hydrogen fuel and oxygen from the air to produce electricity, heat, and water. Fuel cells do not utilize combustion, and as such, fuel cells produce little if any hazardous effluents. Fuel cells convert hydrogen fuel and oxygen directly into electricity, and can be operated at much higher efficiencies than internal combustion electric generators, for example.

The gasketed membrane and MEA webs illustrated by various embodiments described herein are particularly useful in the fabrication of polymer electrolyte membrane (PEM) fuel cells. A typical fuel cell configuration is depicted in FIG. 1. The fuel cell 110 shown in FIG. 1 includes a first fluid flow plate 112 adjacent a first gas diffusion layer (GDL) 114. Adjacent the GDL 114 is a catalyst coated membrane (CCM) 120. A second GDL 118 is situated adjacent the CCM 120, and a second fluid flow plate 119 is situated adjacent the second GDL 118.

In operation, hydrogen fuel is introduced into the anode portion of the fuel cell 110, passing over the first fluid flow plate 112 and through the GDL 114. At the interface of the GDL 114 and the CCM 120, on the surface of the catalyst layer 115, the hydrogen fuel is separated into hydrogen ions ($H^+$) and electrons ($e^-$).

The electrolyte membrane 116 of the CCM 120 permits only the hydrogen ions or protons and water to pass through the electrolyte membrane 116 to the cathode catalyst layer 113 of the fuel cell 110. The electrons cannot pass through the electrolyte membrane 116 and, instead, flow through an external electrical circuit in the form of electric current. This current can power an electric load 117, such as an electric motor, or be directed to an energy storage device, such as a rechargeable battery.

Oxygen flows through the second GDL 118 at the cathode side of the fuel cell 110 via the second fluid flow plate 119. On the surface of the cathode catalyst layer 113, oxygen, protons, and electrons combine to produce water and heat.

Individual fuel cells, such as that shown in FIG. 1, can be combined with a number of other fuel cells to form a fuel cell stack. The number of fuel cells within the stack determines the total voltage of the stack, and the surface area of each of the cells determines the total current. The total electrical power generated by a given fuel cell stack can be determined by multiplying the total stack voltage by total current.

A fuel cell stack is comprised of multiple electrodes, plates, and gaskets. The gaskets are typically deployed around the perimeter of the active area of the electrolyte membrane. Catalyst may be disposed on the surfaces of the membrane, on the GDLs, or may be disposed partially on the GDLs and partially on the membrane. The gaskets may be placed on one or both surfaces of the electrolyte membrane, and/or on one or both surfaces of the GDLs, and/or on one or both surfaces of the fluid flow plates that face the GDLs. Attachment of a gasket to the electrolyte membrane using an adhesive in accordance with fabrication processes described herein allows for roll to roll manufacture of fuel cell components with accurate placement and attachment of the gasket.

Roll good webs used in the formation of fuel cells, such as the fuel cell 110 shown in FIG. 1, can be produced as a roll good output from roll good input materials (e.g., webs of fuel cell components) in accordance with embodiments of the present invention. For example, roll good gasketed electrolyte membrane webs, roll good gasketed CCM webs, and/or roll good gasketed MEA webs can be fabricated using a continuous assembling approach by which roll good input web materials are processed to produce a roll good output web.

Output fuel cell webs can be wound with appropriate liner material to form a roll. In another approach, the fuel cell web can be converted into individual MEAs in a subsequent step. In some approaches, GDLs can be bonded to gasketed roll-good membrane webs to produce MEA webs in a continuous manner.

Figure 2A:
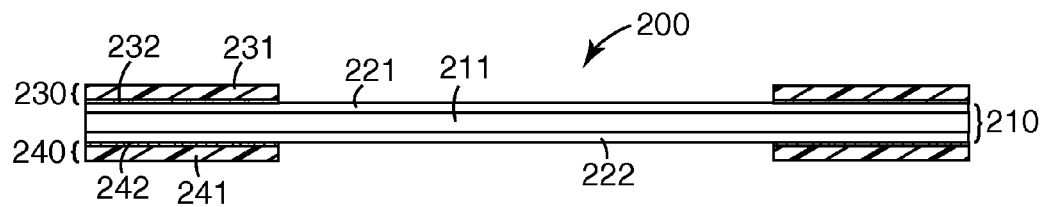
FIGS. 2A and 2B are cross sectional and plan views, respectively, of a gasketed catalyst coated membrane (CCM) in accordance with an embodiment of the present invention.
Figure 2B:
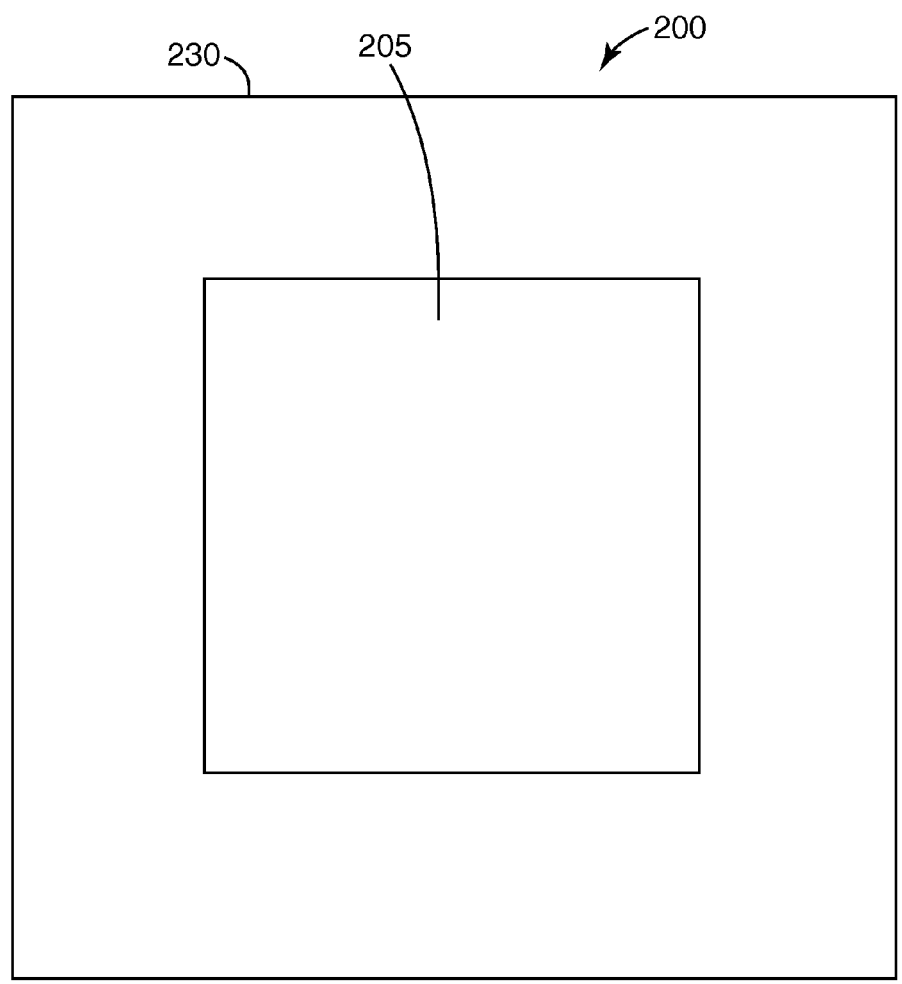

FIGS. 2A and 2B provide a cross sectional view and plan views, respectively, of a single gasketed catalyst coated membrane (CCM) 200 which may be formed as a roll good web in accordance with one embodiment. The gasketed CCM 200 includes a CCM 210 having an electrolyte membrane 211 and first and second catalyst layers 221, 222 disposed on the membrane 211. First and second gaskets 230, 240 are arranged on surfaces of the CCM 210. As best seen in FIG. 2B, a gasket 230 form a frame around the active area 205 on one surface of the CCM 210. Each gasket 230, 240, includes a gasket layer 231, 241, and an adhesive layer 232, 242, such as a pressure sensitive, thermally or UV activated adhesive layer. The gaskets 230, 240 are attached to the CCM via the adhesive layers 232, 242.

The gasket layer 231, 232 may comprise various types of polymer material, such as polyester, polyimide, polyethylene naphthalate (PEN), polyethylene telephthalate (PET) and/or other similar materials, including rigid polymeric materials that are sufficiently thin, sufficiently strong, and sufficiently compatible with the fuel cell environment, i.e., temperatures of 60-120° C., in the presence of water, hydrogen and/or oxygen. In one example, the gasket material has a thickness greater than about 0.0125 mm with an adhesive layer thickness of about 0.00625 to about 0.05 mm. In one embodiment, the gasket material is a polyester having a thickness of about 0.1 mm. The gasket material may include microstructured elastomeric ribs, such as thermally cured ethylene propylene diene monomer (EPDM) elastomeric ribs having a height of about 0.25 mm. The first and second gasket layers need not have identical characteristics. The characteristics of the gasket layers may be selected to facilitate component handling or fuel cell operation. For example, in certain embodiments, the first gasket layer 230 may have a different thickness from a second gasket layer 240 and/or the first gasket layer 230 may comprise one or more materials that are different from those of the second gasket layer 240.

The materials of the gasket layers 231, 241 and the adhesive layers 232, 242 are selected so that the adhesive layers 232, 242 adhere well to the gasket layers 231, 241 and to CCM 210. The adhesive layers 232, 242 may comprise a pressure sensitive adhesive (PSA), a heat activated adhesive, a UV activated adhesive, or other type of adhesive. For example, the adhesive layer may comprise any of the following: acrylic PSA's, rubber based adhesives, ethylene maleic anhydride copolymers, olefin adhesives such as copolymers of 1-octene with ethylene or propylene, nitrile based adhesives, epoxy based adhesives, and urethane based adhesives. In other embodiments, the adhesive layer may comprise a thermally activated adhesive, such as Thermobond 845 (polyethylene maleate based) and Thermobond 583 (nitrile rubber based).

The gasketed CCM 200 illustrated in FIGS. 2A and 2B may be fabricated as a web comprising a plurality of individual gasketed CCMs in a roll-to-roll process. FIGS. 3A and 3B illustrate cross sectional and plan views, respectively, of a gasketed CCM web 300 which may be cut to form a plurality of individual gasketed CCMs such as the gasketed CCM illustrated in FIGS. 2A and 2B. FIG. 3A illustrates a continuous CCM web comprising a continuous membrane 311 that has continuous catalyst layers 321, 322 disposed thereon. In other embodiments, the membrane web may be without catalyst or may include patterned catalyst areas rather than continuous catalyst layers.

The gasketed CCM web 300 of FIG. 3A includes gasket layers 331, 341 that frame active areas 305 of a continuous CCM web 300. The gasket layers 331, 341 are attached to the CCM web 310 via adhesive layers 332, 342.

The gasketed CCM web illustrated in FIGS. 3A and 3B may be fabricated in a roll to roll process. For example, in one embodiment, fabrication of a gasketed CCM web includes feeding a gasket web, including gasket and adhesive layers, through a cutting station that cuts out a series of active area apertures in the gasket layer, forming a gasket web. The cutting station may include, for example, a rotary die cutter, laser cutter or a stationary die. The gasket ladder web is transported to a bonding station where it is brought together with a CCM web and another gasket ladder web on the opposite side of the CCM web. Timing of the webs is accomplished by starting the aperture cutters of the cutting stations when a cut is needed and stopping or slowing them between cuts. Speed matching is used at all stations. The adhesive layers of the gasket ladder webs may include release liners. If so, the release liners are removed, e.g., peeled away, and the gasket ladder webs are bonded to surfaces of the CCM web at the bonding station via the adhesive layers of the gasket webs. Vacuum belt conveyers may be used to hold the gasket ladder webs against the peel force of the liner removal. Peel bars and/or idlers may be used to facilitate speed of the peel.

Various embodiments of the present invention address handling the weak gasket webs without distortion. For example, the gasket webs may be conveyed to the bonding station on a vacuum belt, or on a convex surface such as a roller, or supported by another web, such as a disposable tape, or deployed on carrier webs, such as releasable adhesive carrier webs.

The electrolyte membrane employed in fuel cells typically comprises an expensive ionomer. Gasket materials are generally considerably less expensive. When viewed in plan view, the gasket area of a typical gasketed CCM, which is an area situated around the perimeter, covers an appreciable portion of the CCM, preventing the covered area of the CCM from being part of the active area of the fuel cell. While existing electrode designs typically use a membrane that is coextensive with the entire gasketed area, it may be possible to economize on membrane material by removing the membrane from portions covered by the gasket. An electrolyte membrane web or CCM web thrifted in the cross web direction does not extend to the edges of the gasket layers in the cross web direction.

Figure 4:
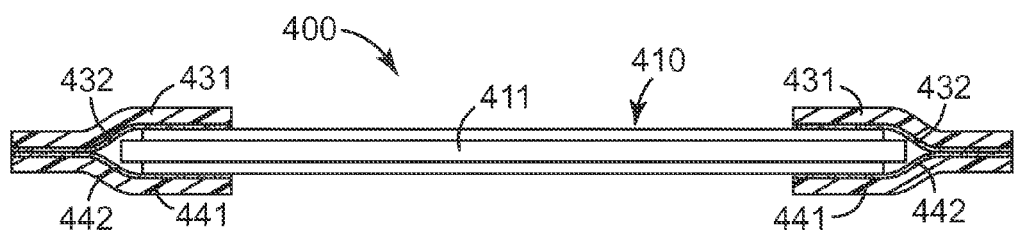
FIG. 4 is a cross sectional view of a gasketed CCM shown in the cross-web orientation and having a thrifted electrolyte membrane in accordance with an embodiment of the invention.

FIG. 4 illustrates a cross sectional view of a gasketed CCM web 400 in the cross web orientation. As can be seen in FIG. 4, the electrolyte membrane web 411 is thrifted or economized in the cross web direction and does not extend completely to the edges of the gasket layers 431, 441. In this implementation, the adhesive layers 432, 442 adhere to the CCM web 411 and to each other to form the seal. The CCM web 411 should be intact in the down web direction to maintain the web format. The advantages of the thrifting the CCM web 411 in the cross web direction include reduced membrane costs and removal of membrane in the manifold areas which can sometimes be considered a problem due to the humidity changes.

Figure 5A:
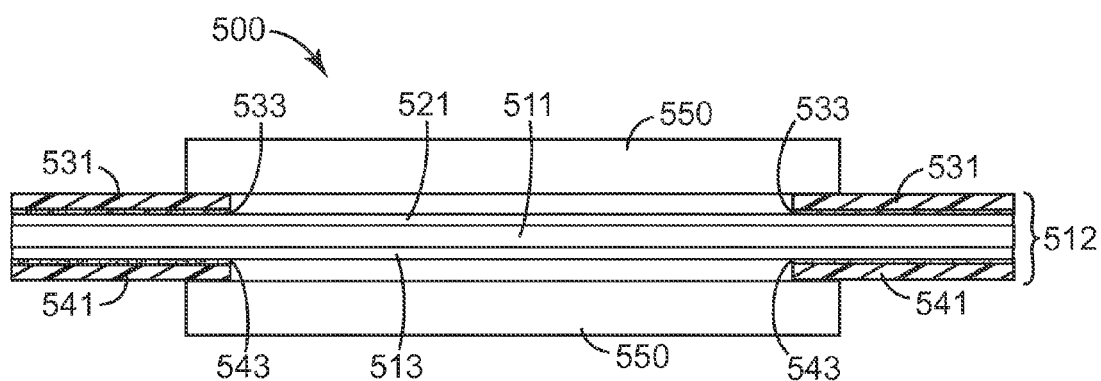
FIG. 5A is a cross sectional view of a membrane electrode assembly (MEA) including a gasketed CCM and gas diffusion layers (GDLs) which may be formed as a roll good in accordance with an embodiment of the invention.

FIG. 5A illustrates a membrane electrode assembly (MEA) 500 having a gasketed CCM 512 and attached GDLs 550 in accordance with one embodiment. In this embodiment, the membrane 511 includes catalyst layers 521, 513. The adhesive layers 533, 543 adhere to the catalyst layers 533 and 543, respectively. The GDLs 550 overlap a portion of the gasket layers 531, 541 of the gasketed CCM 512 providing membrane edge protection when the GDLs 550 are added to produce an MEA 500. In some embodiments, after formation of a gasketed CCM web as described herein, the GDLs 550 may be attached to the gasketed CCM in a continuous and/or roll-to-roll process.

Figure 5B:
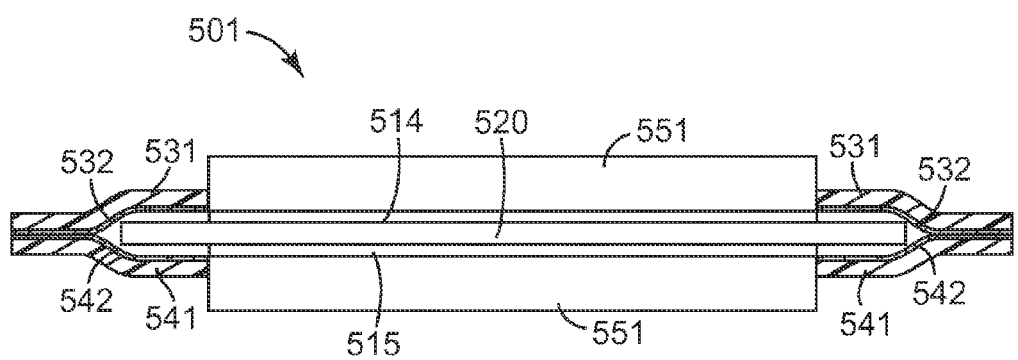
FIG. 5B is a cross sectional view of an MEA including a gasketed electrolyte membrane and GDLs having catalyst layers disposed thereon which may be formed as a roll good in accordance with an embodiment of the invention.

FIG. 5B illustrates an MEA 501 incorporating catalyst coated GDLs 551, which are referred to as catalyst coated backings, or CCBs. In this embodiment, the GDLs 551 include catalyst layers 514, 515 and are disposed within apertures of the gasket layers 531, 541. The adhesive layers 532, 542 adhere to the membrane 520 and to each other to form the seal. As described in more detail herein, the GDLs may be attached to the membrane web via a roll to roll process to form an output MEA web.

Any suitable electrolyte membrane may be used in the practice of the present invention. Useful PEM thicknesses range between about 200 μm and about 15 μm. Copolymers of tetrafluoroethylene (TFE) and a co-monomer according to the formula: $FSO_2-CF_2-CF_2-O-CF(CF_3)-CF_2-O-CF=CF_2$ are known and sold in sulfonic acid form, i.e., with the $FSO_2$- end group hydrolyzed to $HSO_3$-, under the trade name NAFION® by DuPont Chemical Company, Wilmington, Del. NAFION® is commonly used in making polymer electrolyte membranes for use in fuel cells. Copolymers of tetrafluoroethylene (TFE) and a co-monomer according to the formula: $FSO_2-CF_2-CF_2-O-CF=CF_2$ are also known and used in sulfonic acid form, i.e., with the $FSO_2$- end group hydrolyzed to $HSO_3$-, in making polymer electrolyte membranes for use in fuel cells. Most preferred are copolymers of tetrafluoroethylene (TFE) and $FSO_2-CF_2CF_2CF_2CF_2-O-CF=CF_2$, with the $FSO_2$- end group hydrolyzed to $HSO_3$-. Other materials suitable for PEM construction are described in commonly owned U.S. patent application Ser. No. 11/225,690 filed 13 Sep. 2005 which is incorporated herein by reference.

In some embodiments, the catalyst layers may comprise Pt or Pt alloys coated onto larger carbon particles by wet chemical methods, such as reduction of chloroplatinic acid. This form of catalyst is dispersed with ionomeric binders and/or solvents to form an ink, paste, or dispersion that is applied either to the membrane, a release liner, or GDL.

In some embodiments, the catalyst layers may comprise nanostructured support elements bearing particles or nanostructured thin films (NSTF) of catalytic material. Nanostructured catalyst layers do not contain carbon particles as supports and therefore may be incorporated into very thin surface layers of the electrolyte membrane forming a dense distribution of catalyst particles. The use of nanostructured thin film (NSTF) catalyst layers allows much higher catalyst utilization than catalyst layers formed by dispersion methods, and offer more resistance to corrosion at high potentials and temperatures due to the absence of carbon supports. In some implementations, the catalyst surface area of a CCM may be further enhanced by using an electrolyte membrane having microstructured features. Various methods for making microstructured electrolyte membranes and NSTF catalyst layers are described in the following commonly owned patent documents which are incorporated herein by reference: U.S. Pat. Nos. 4,812352, 5,879,827, and 6,136,412 and U.S. patent application Ser. No. 11/225,690 filed Sep. 13, 2005 and Ser. No. 11/224,879, filed Sep. 13, 2005.

NSTF catalyst layers comprise elongated nanoscopic particles that may be formed by vacuum deposition of catalyst materials on to acicular nanostructured supports. Nanostructured supports suitable for use in the present invention may comprise whiskers of organic pigment, such as C.I. PIGMENT RED 149 (perylene red). The crystalline whiskers have substantially uniform but not identical cross-sections, and high length-to-width ratios. The nanostructured support whiskers are coated with coating materials suitable for catalysis, and which endow the whiskers with a fine nanoscopic surface structure capable of acting as multiple catalytic sites.

In certain implementations, the nanostructured support elements may be extended through continued screw dislocation growth. Lengthening the nanostructured support elements allows for an increased surface area for catalysis. Processes for lengthening the nanostructured support elements are described in previously incorporated U.S. patent application Ser. No. 11/225,690. Additionally, or alternatively, multiple layers of nanostructured support elements also provide for an increased surface area. Processes producing multiple layers of nanostructured support elements are described in previously incorporated U.S. patent application Ser. No. 11/224,879.

The nanostructured support elements are coated with a catalyst material to form a nanostructured thin film catalyst layer. According to one implementation, the catalyst material comprises a metal, such as a platinum group metal. In one embodiment, the catalyst coated nanostructured support elements may be transferred to a surface of an electrolyte membrane to form a catalyst coated membrane. In another embodiment, the catalyst coated nanostructured support elements maybe formed on a GDL surface.

The GDLs can be any material capable of collecting electrical current from the electrode while allowing reactant gasses to pass through, typically a woven or non-woven carbon fiber paper or cloth. The GDLs provide porous access of gaseous reactants and water vapor to the catalyst and membrane, and also collect the electronic current generated in the catalyst layer for powering the external load.

The GDLs may include a microporous layer (MPL) and an electrode backing layer (EBL), where the MPL is disposed between the catalyst layer and the EBL. EBLs may be any suitable electrically conductive porous substrate, such as carbon fiber constructions (e.g., woven and non-woven carbon fiber constructions). Examples of commercially available carbon fiber constructions include trade designated "AvCarb P50" carbon fiber paper from Ballard Material Products, Lowell, Mass.; "Toray" carbon paper which may be obtained from ElectroChem, Inc., Woburn, Mass.; "SpectraCarb" carbon paper from Spectracorp, Lawrence, Mass.; "AFN" non-woven carbon cloth from Hollingsworth & Vose Company, East Walpole, Mass.; and "Zoltek" carbon cloth from Zoltek Companies, Inc., St. Louis, Mo. EBLs may also be treated to increase or impart hydrophobic properties. For example, EBLs may be treated with highly-fluorinated polymers, such as polytetrafluoroethylene (PTFE) and fluorinated ethylene propylene (FEP).

The carbon fiber constructions of EBLs generally have coarse and porous surfaces, which exhibit low bonding adhesion with catalyst layers. To increase the bonding adhesion, the microporous layer may be coated to the surface of EBLs. This smoothens the coarse and porous surfaces of EBLs, which provides enhanced bonding adhesion with some types of catalyst layers.

Figure 6A:
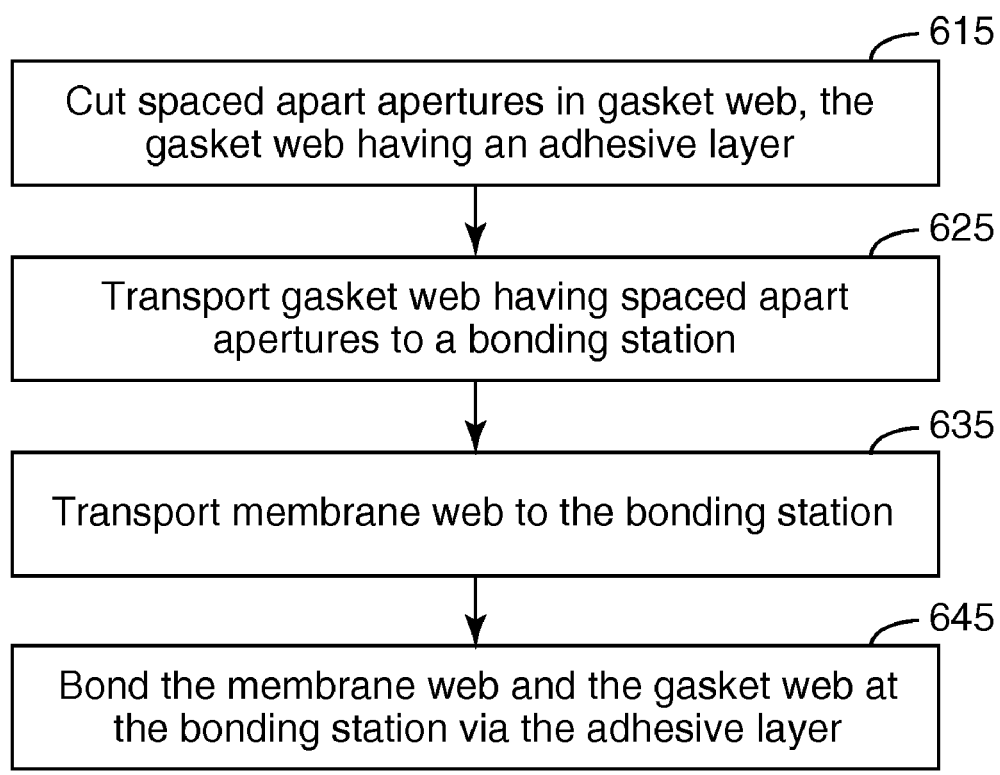
FIG. 6A is a diagram illustrating a process for fabricating a half gasketed membrane web in accordance with embodiments of the invention.

Embodiments of the invention are directed to processes for fabricating roll good half or full gasketed electrolyte membrane webs, CCM webs, and/or MEA webs. FIG. 6A is a diagram illustrating a method that may be used to fabricate a half gasketed membrane web in accordance with embodiments of the invention. The process involves cutting 615 spaced apart apertures in a gasket web and transporting 625 the resulting gasket web to a bonding station. The gasket web includes a gasket layer and an adhesive layer that may optionally include a release liner. The gasket web may be delivered from an unwind wheel or another source. After the cutting the apertures, the resulting gasket web resembles a ladder-like structure that may be supported and transported through portions of the fabrication process on a vacuum conveyor or other support mechanism.

A membrane web, which may be a CCM web having continuous or patterned catalyst layers is transported 635 to the bonding station. At the bonding station, the gasket web and a membrane web are brought together. Registration between the gasket web and the membrane web may be implemented if the membrane web includes patterned catalyst areas. The gasket web and the membrane web are bonded 645 at the bonding station, through one or more of heat, pressure, and UV exposure for example.

Figure 6B:
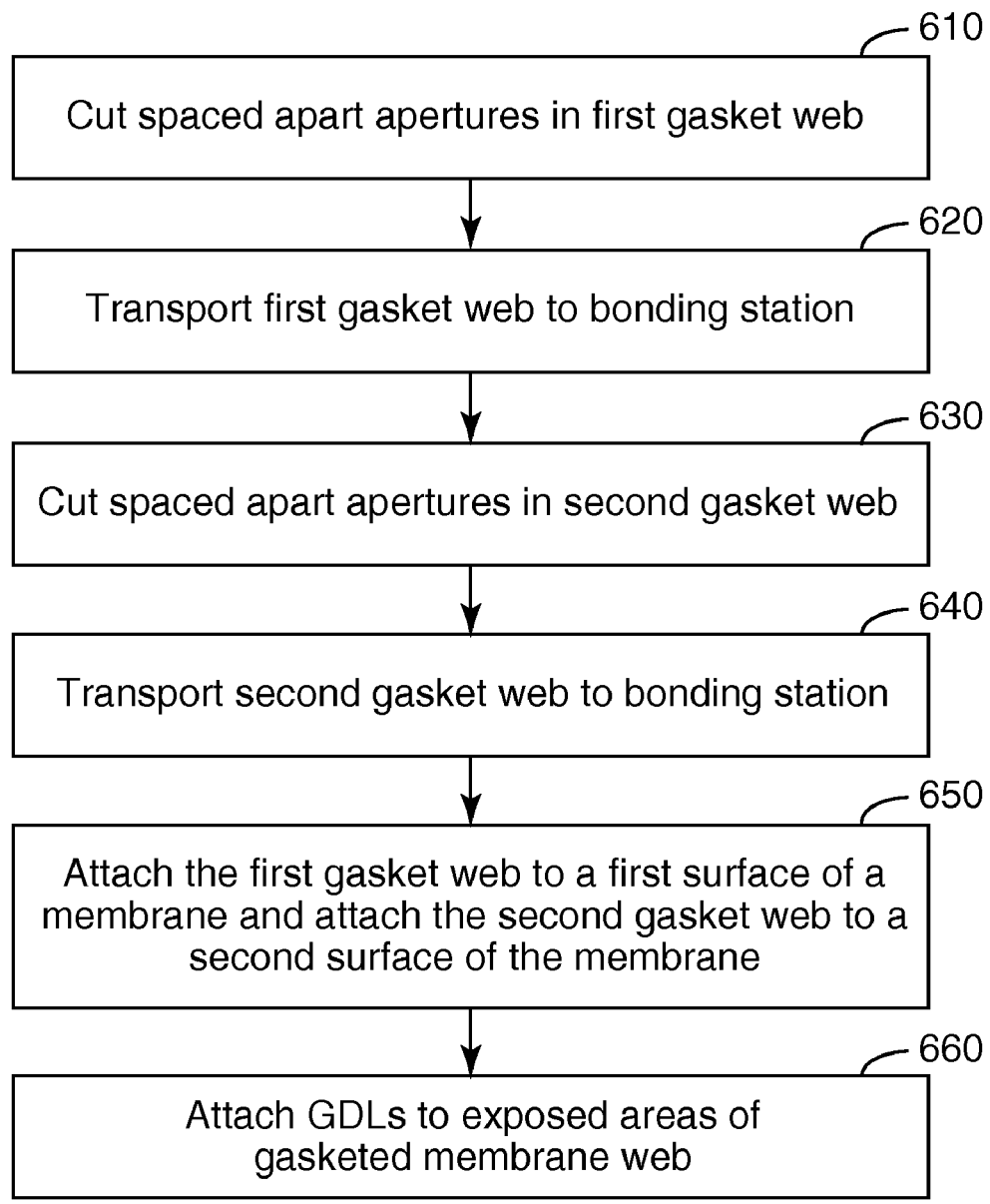
FIG. 6B is a diagram illustrating a process for fabricating gasketed membrane webs and/or gasketed MEA webs in accordance with embodiments of the invention.

FIG. 6B is a flow diagram illustrating a method that may be used to fabricate gasketed membrane and/or MEA webs in accordance with embodiments of the invention. The method involves movement of various material webs through the fabrication process. The process involves cutting 610 spaced apart apertures in a first gasket web and transporting 620 the resulting first gasket web to a bonding station. Apertures are cut 630 in a second gasket web and the resulting second gasket web is transported 640 to the bonding station. Each of the first and second gasket webs include a gasket layer and an adhesive layer that may optionally include a release liner. The first and second gasket webs may be delivered from unwind wheels or another source. After the cutting the apertures, the resulting gasket webs resemble ladder-like structures that may be supported and transported through portions of the fabrication process on a vacuum conveyor or other support mechanism.

At the bonding station, the first gasket web, the second gasket web and a membrane web are brought together. The first and second gasket webs and the membrane web are aligned. Registration between the first gasket web and the second gasket web may be controlled so that the apertures of the first and second gasket webs are aligned with each other on first and second surfaces of the membrane web.

If release liners are used, they are removed before the gasket webs enter the bonding station. The first gasket web and the second gasket web are respectively attached 650 to first and second surfaces of the membrane web via the adhesive layers of the gasket webs. In one embodiment, attachment of the first and second gasket ladder webs occurs substantially simultaneously by running all three webs through a single pair of bonding rollers. In another embodiment, the first and second gasket webs are attached to the membrane web sequentially. In some embodiments, the membrane web comprises a CCM web with catalyst disposed over the surface of the membrane web or patterned in regions on the membrane web. If a patterned CCM web is used, the patterned regions are aligned with the apertures of the first and second gasket webs. The resulting gasketed membrane web or CCM web may be rolled up and stored for later use, or may be immediately used in subsequent fabrication processes to make an MEA web and/or other fuel cell subassemblies.

As further illustrated in the flowchart of FIG. 6, an MEA web maybe formed using the gasketed membrane web by attaching 660 GDLs or CCBs at the membrane web areas exposed by apertures in the gasket layers. In one implementation, the GDLs or CCBs may be disposed within the apertures of the gasket layers on both surfaces of the membrane web. In another implementation, the GDLs or CCBs may overlap the gasket layers at the inner edges of the gasket layers.

Figure 7:
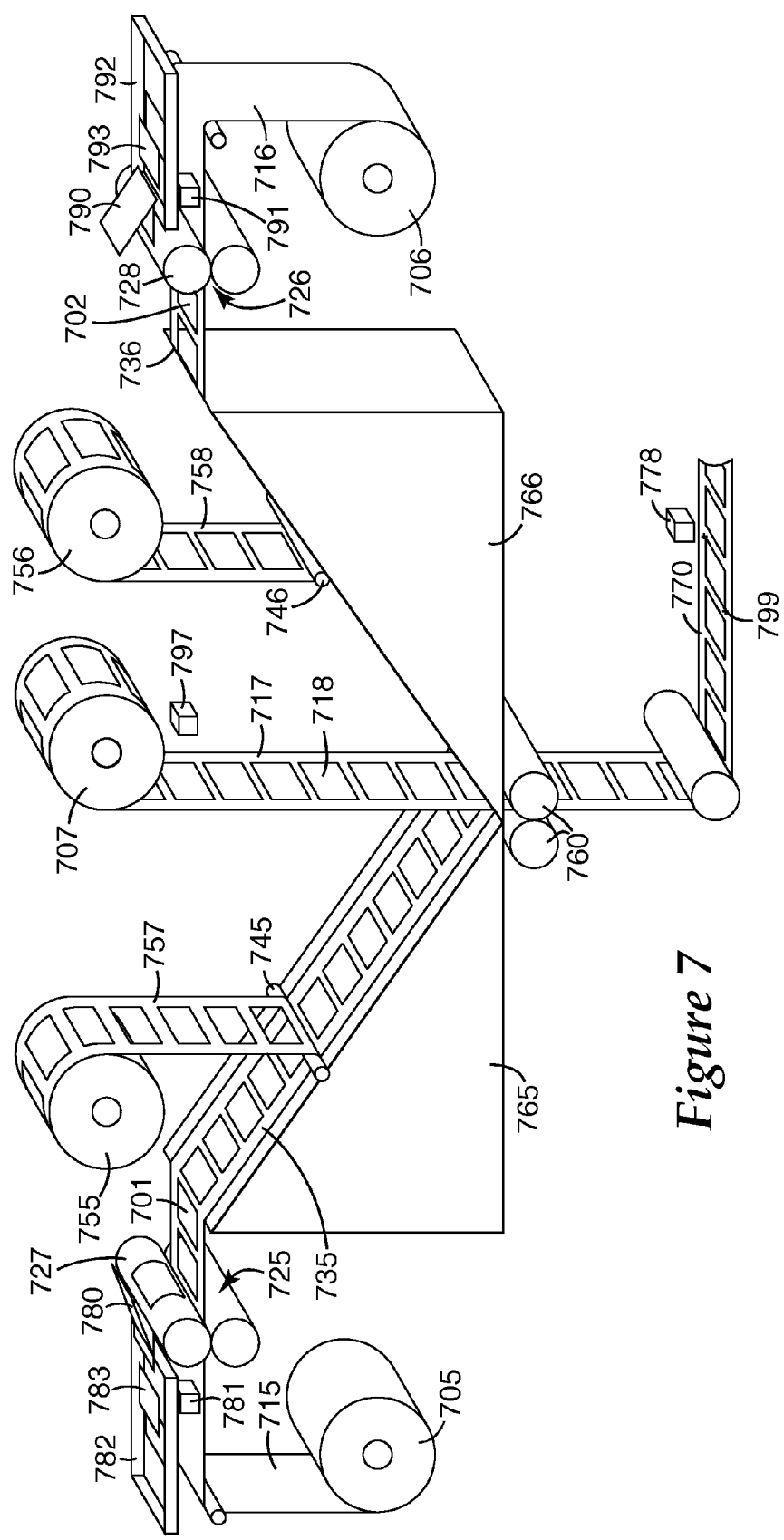
FIG. 7 depicts an apparatus that fabricates a roll good gasketed membrane web by concurrently bonding first and second gasket webs to a membrane web in accordance with an embodiment of the invention.

An apparatus that processes input webs of fuel cell materials and produces roll good gasketed CCMs is illustrated in FIG. 7. In general terms, the apparatus of FIG. 7 can produce roll good gasketed membrane webs using roll good gasket webs and roll good electrolyte membrane webs or CCM webs. The apparatus of FIG. 7 provides a unique approach to fabricating a gasketed membrane web that may be separated into multiple individual gasketed membranes or gasketed CCMs or may be used in a subsequent roll to roll process to fabricate fuel cell components.

In the embodiment depicted in FIG. 7, fabrication of a gasketed membrane web includes feeding an uncut first gasket web 715, including a gasket layer, an adhesive layer, and an adhesive release liner from a first unwind wheel 705 and through a first cutting station 725. The cutting station 725 cuts out a series of active area apertures 701 in the gasket web 715, forming a ladder-like first gasket web 735. The release liner 757 of the first gasket web 735 is removed. Removal of the release liner 757 is facilitated by a peel bar 745 or idler and the release liner 757 is rolled up on a first waste wheel 755.

An uncut second gasket web 716 is delivered from a second unwind wheel 706 and fed through a second cutting station 726. The second cutting station 726 cuts out a series of active area apertures 702 in the second gasket web 716, forming a ladder-like second gasket web 736. The release liner 758 of the second gasket web 736 is removed. Removal of the release liner 758 is facilitated by a peel bar 746 or idler and the release liner 758 is rolled up on a second waste wheel 756. The cutting stations 725, 726 may include, for example, rotary die cutters or laser cutters.

In the embodiment illustrated in FIG. 7, the cutting stations 725, 726 include vacuum die cutters 727, 728. Vacuum is turned on at the vacuum die cutters 727, 728 to remove the cut aperture slugs 783, 793 from the gasket web 735, 736. The vacuum is removed as the leading edges of the aperture slugs 783, 793 are rotated about 225° from the cutting surface. Removing the vacuum releases the aperture slugs 783, 793 to trays 782, 792 or to a vacuum scrap disposal plenum. Spring accumulators 780, 790 may be used to hold the slugs 783, 793 so that upon release of the vacuum the slugs 783, 793 are pushed into the trays 782, 792 or plenum with friction from the dies 727, 728.

After removal of the release liners, 757, 758 the first and second gasket webs 735, 736 are transported to a bonding station, which, in this example, comprises cylindrical bonding rollers 760. In certain embodiments, as illustrated in FIG. 7, the gasket webs 735, 736 are transported to the bonding rollers 760 on vacuum conveyers 765, 766. A membrane web 717 is delivered from a membrane unwind wheel 707 and is transported to the bonding rollers 760.

Those skilled in the art will appreciate that several techniques and configurations can be employed to facilitate alignment using optical sensors or other types of sensing arrangements. Sensors 781, 791 are used to detect the leading edge of the aperture cut. Bias and registration marks sensed by sensor 781, 791, e.g., a retro reflective laser sensor, are used to align the left hand gasket ladder 735 with the right hand gasket ladder 736. If the membrane web 717 includes patterned catalyst areas 718, a sensor 797, such as a through beam fiber optic sensor, may be used to detect the leading edge of the catalyst areas. Output from the sensor 797 is used by a control system along with information from sensor 781 or 791 to align the catalyst areas 718 to the gasket webs 735 and 736. Fiducial marks 799 may be sensed by sensor 778 to facilitate alignment of the three webs 735, 736, 717.

Information from sensors, such as sensors 781, 791, 797 may be used by a control system to control the speed and longitudinal position of one or more of the first gasket web 735, the second gasket web 736 and the membrane web 717. Timing of the webs 735, 736, 717 to facilitate alignment may be accomplished by starting the aperture cutters 727, 728 of the cutting stations 725, 726 when a cut is needed and stopping or slowing them between cuts. Matching the speed of the cutting stations 725, 726 and bonding rollers 760 during the aperture cutting keeps aperture size constant in gasket webs 735, 736.

After alignment, the gasket webs 735, 736 are brought together with the membrane web 717 at the bonding rollers 760. The gasket webs 735, 736 are bonded substantially simultaneously to respective first and second surfaces of the membrane web 717 by the bonding rollers 760 via the adhesive layers of the gasket webs 735, 736 to form a gasketed membrane web 770.

In some embodiments, the adhesive layers of the gasket webs 735, 736 comprise pressure sensitive adhesive. In these embodiments attachment of the gasket webs 735, 736 may be effected by application of pressure via the bonding rollers 760 operating at room temperature. In other embodiments, the adhesive layers of the gasket webs 735, 736 comprise a thermally activated adhesive and the bonding rollers 760 are heated to facilitate attachment of the gasket webs 735, 736 to the membrane web 717. In yet other embodiments, the adhesive comprises a UV activated adhesive. If an UV activated adhesive is used, bonding is facilitated by exposure to UV light via a light source which may be located near the bonding rollers 760. Adhesive release liners may or may not be used.

In some implementations, the gasketed membrane web 770 is wound on a wind wheel for storage and/or later use in subsequent processing. In other implementations, the gasketed membrane web 770 is transported to another processing stage, such as a processing stage for formation of an MEA web incorporating the gasketed membrane web 770.

Figure 8:
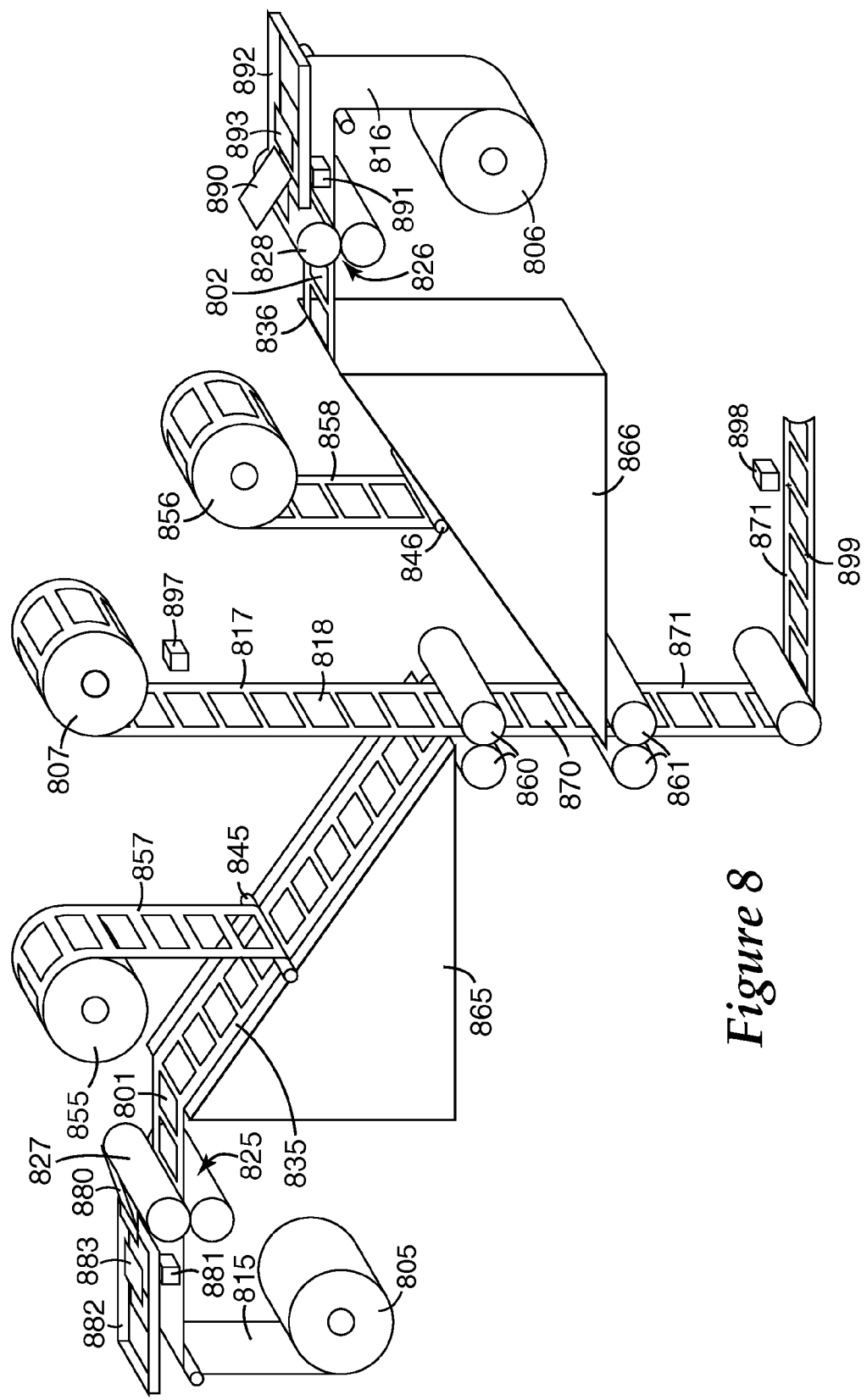
FIG. 8 shows an apparatus that fabricates a roll good gasketed membrane web by sequential bonding of a first gasket web and a second gasket web to a membrane web in accordance with embodiments of the invention.

FIG. 8 illustrates a fabrication apparatus wherein a first gasket web 835 and optionally a second gasket web 836 are bonded to a membrane web. In one process a half gasketed membrane may be formed by bonding the first gasket web 835 to the membrane 817. In this process, the second gasket web 836 is not bonded to the membrane 817. The half gasketed membrane may be used in applications where a thinner web is required.

Optionally, a second gasket web 836 may be attached to the membrane 817 to form a full gasketed membrane web as described below. If a full gasketed membrane web is formed, the first and second gasket webs 835, 836 may be sequentially bonded to the membrane web 817. For example, as illustrated in FIG. 8, the second gasket web 836 is attached to the membrane web 817 after attachment of the first gasket web 835.

Fabrication of a gasketed membrane web 871 includes feeding an uncut first gasket web 815, including a gasket layer, an adhesive layer, and an adhesive release liner from a first unwind wheel 805 and through a first cutting station 825. As previously described in connection with FIG. 7, the cutting station 825 may include a vacuum die cutter 827 that picks up and deposits the aperture slugs 883 in a tray 882 using a spring accumulator 880. The cutting station 825 cuts out a series of active area apertures 801 in the gasket web 815, forming a ladder-like first gasket web 835. The release liner 857 of the first gasket web 835 is removed. Removal of the release liner 857 is facilitated by a peel bar 845 or idler and the release liner 857 is rolled up on a first waste wheel 855.

Removal of the release liner 857 of the first gasket web 835 exposes the adhesive layers of the first gasket web 835. The first gasket web 835 is transported on a vacuum conveyer or other transport mechanism 865 to a bonding station, which, in this example, comprises cylindrical bonding rollers 860. A membrane web 817 is delivered from a membrane unwind wheel 807 and is transported to the bonding rollers 860.

As previously explained in connection with FIG. 7, information acquired from one or more sensors may be used by a control system to align the first gasket web 835 for placement on the membrane web 817 in proper alignment with the catalyst areas 818. After alignment, the first gasket web 835 is brought together with the membrane web 817 at the bonding rollers 860. The gasket web 835 is bonded to a first surface of the membrane web 817 by the bonding rollers 860 via the exposed adhesive layer of the first gasket web 835 to form a partially gasketed membrane web 870.

An uncut second gasket web 816 is delivered from a second unwind wheel 806 and fed through a second cutting station 826. The second cutting station 826 uses a vacuum die cutter 828 to cut out a series of active area apertures 802 in the second gasket web 816, forming a ladder-like second gasket web 836. Aperture slugs 893 are picked up by the vacuum die cutter 828 through use of a spring accumulator 890 and are deposited in tray 892.

The release liner 858 of the second gasket web 836 is removed. Removal of the release liner 858 is facilitated by a peel bar 846 or idler and the release liner 858 is rolled up on a second waste wheel 856. The cutting stations 825, 826 may include, for example, rotary die cutters or laser cutters.

Removal of the release liner 858 of the second gasket web 836 exposes the adhesive layers of the second gasket web 836. The second gasket web 836 is transported on a vacuum conveyer or other transport mechanism 866 to a bonding station, which, in this example, comprises cylindrical bonding rollers 861. The partially gasketed membrane web 870 is delivered to the bonding rollers 861.

Prior to bonding, information one or more sensors may be used to align the second gasket web 836 for placement on the membrane web 870. The second gasket web 836 may be aligned with respect to the first gasket web 835 disposed on the partially gasketed membrane web 870. For example, fiducial marks 899 sensed by sensor 898 may be used to facilitate alignment of the three webs 835, 836, 817.

In some implementations, the fully gasketed membrane web 871 is wound on a wind wheel for storage and/or later use in subsequent processing. In other implementations, the gasketed membrane web 871 is transported to another processing stage, such as a processing stage for formation of an MEA web incorporating the gasketed membrane web 871 as illustrated in FIG. 9.

Figure 9:
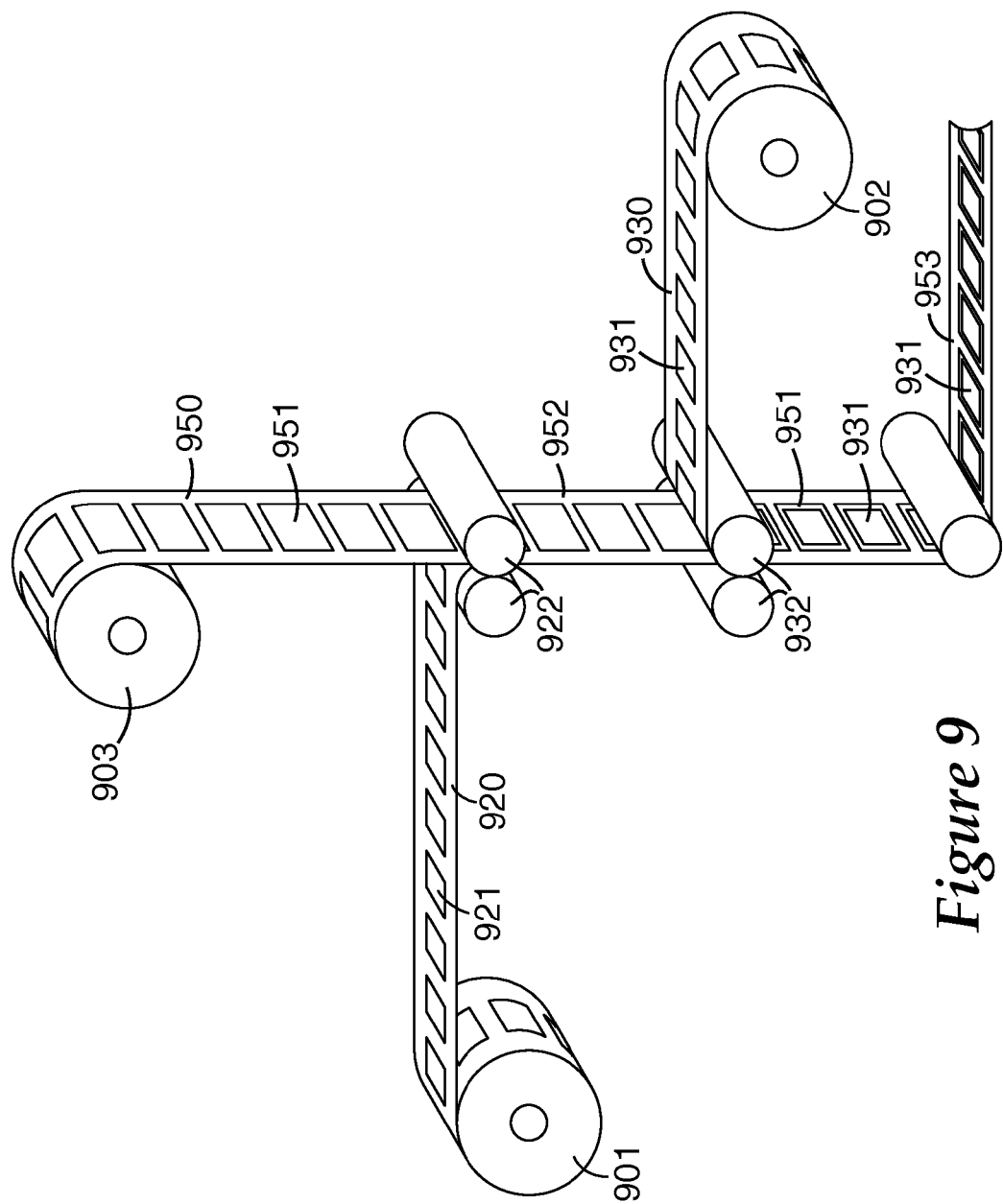
FIG. 9 illustrates an apparatus for fabricating a gasketed MEA web in accordance with embodiments of the invention.

FIG. 9 illustrates an apparatus configured to fabricate a roll good MEA web having a gasketed membrane web. A gasketed membrane web, such as a gasketed CCM web 950 is delivered from an unwind wheel 903 or directly from a previous process. First GDLs 921 disposed on a carrier web 920 are delivered from a unwind wheel 901 or from a previous process. The first GDLs 921 and the CCM web 950 are transported to bonding rollers 922 where the first GDLs 921 are aligned with respect to apertures 951 in the gasket layer of the CCM web 950. The first GDLs 921 are bonded to a first surface of the gasketed membrane web 950. For example, the first GDLs 921 may be aligned for placement within the apertures 951 of the gasketed CCM web 950 or may be aligned so that the first GDLs 921 slightly overlap the gasket.

Second GDLs 931 disposed on carrier web 930 are delivered from an unwind wheel 902 or from a previous process. Second GDLs 931 disposed on a carrier web 930 are delivered from a unwind wheel 902 or from a previous process. The second GDLs 931 and the CCM web 952 are transported to bonding rollers 932 where the second GDLs 931 are aligned with respect to apertures 951 in the gasket layer of the CCM web 952. The second GDLs 931 are bonded to a second surface of the gasketed membrane web 952 to form a roll good MEA web 953. GDLs may be attached to web using heat and pressure or using an adhesive layer deposited on at least a portion of the GDL or the CCM or gasket if the GDLs overlap the gasket, wherein the adhesive layer may comprise an adhesive available from 3M Company under the Fastbond series or an ionomer. In some implementations, the first and second GDLs may fit within the apertures 951 of the gasketed CCM web 950 on one or more edges and overlap the gasket on one or more edges.

The foregoing description of the various embodiments of the invention has been presented for the purposes of illustration and description. It is not intended to be exhaustive or to limit the invention to the precise form disclosed. Many modifications and variations are possible in light of the above teaching. For example, the various rotary bonding processes described with reference to the accompanying figures can instead be accomplished using non-rotary methods and apparatuses, such as by use of step and repeat compression processes and apparatuses as are known in the art, for example. It is intended that the scope of the invention be limited not by this detailed description, but rather by the claims appended hereto.

What we claim is:

1. A method of making fuel cell components in a roll to roll process, comprising:
    cutting spaced apart apertures in a first gasket web, the first gasket web comprising a first gasket layer having an adhesive;
    transporting the first gasket web having spaced apart apertures to a bonding station;
    cutting spaced apart apertures in a second gasket web, the second gasket web comprising a second gasket layer having an adhesive;
    transporting the second gasket web having spaced apart apertures to the bonding station;
    transporting a membrane web comprising at least an electrolyte membrane to the bonding station; and
    at the bonding station, forming a gasketed membrane web, comprising:
        attaching the first gasket web to a first surface of the membrane web via the adhesive of the first gasket layer; and
        attaching the second gasket web to a second surface of the membrane web via the adhesive of the second gasket layer, wherein attaching the first and second gasket webs to the membrane web comprises attaching the first and second gasket webs to the membrane web so that the electrolyte membrane does not extend to the edges of the first and second gasket webs in a cross web direction, but does extend to the edges of the first and second gasket webs in the down web direction.

2. The method of claim 1, wherein attaching the first gasket web to the first surface of the membrane web and attaching the second gasket web to the second surface of the membrane web are effected substantially concurrently.

3. The method of claim 1, wherein the first gasket web is attached to the membrane web before the second gasket web is attached to the membrane web.

4. The method of claim 1, further comprising placing catalyst layers on the membrane web before or after attaching the first and second gasket webs to the membrane web.

5. The method of claim 1, wherein:
the electrolyte membrane comprises a catalyst coated electrolyte membrane; and
attaching the first and second gasket webs to the membrane web comprises forming a gasketed catalyst coated membrane web.

6. The method of claim 1, further comprising:
attaching first gas diffusion layers over active areas of the gasketed membrane web; and
attaching second gas diffusion layers over active areas of the gasketed membrane web.

7. The method of claim 6, wherein the first and second gas diffusion layers are attached substantially concurrently.

8. The method of claim 6, wherein the first and second gas diffusion layers are attached sequentially.

9. The method of claim 6, wherein:
the first gas diffusion layers are disposed within apertures of the first gasket layer; and
the second gas diffusion layers are disposed within apertures of the second gasket layer.

10. The method of claim 6, wherein:
the first gas diffusion layers overlap inner edges of the first gasket layer at the apertures of the first gasket layer; and
the second gas diffusion layers overlap inner edges of the second gasket layer at the apertures of the second gasket layer.

11. The method of claim 6, wherein the first and second gas diffusion layers include catalyst layers.

12. The method of claim 1, further comprising removing adhesive liners from the adhesives of the first and second gasket layers prior to attaching the first and second gasket webs to the membrane web at the bonding station.

13. The method of claim 1, wherein:
the adhesive of the first gasket layer comprises a pressure sensitive adhesive;
attaching the first gasket web to the first surface of the membrane web comprises attaching the first gasket web to the first surface of the membrane web via the pressure sensitive adhesive of the first gasket layer using bonding rollers;
the adhesive of the second gasket layer comprises a pressure sensitive adhesive; and
attaching the second gasket web to the second surface of the membrane web comprises attaching the second gasket web to the second surface of the membrane web via the pressure sensitive adhesive of the second gasket layer using the bonding rollers.

14. The method of claim 1, wherein:
the adhesive of the first gasket layer comprises a heat activated adhesive;
attaching the first gasket web to the first surface of the membrane web comprises attaching the first gasket web to the first surface of the membrane web via the heat activated adhesive of the first gasket layer using heated bonding rollers;
the adhesive of the second gasket layer comprises a heat activated adhesive; and
attaching the second gasket web to the second surface of the membrane web comprises attaching the second gasket web to the second surface of the membrane web via the heat activated adhesive of the second gasket layer using the heated bonding rollers.

15. The method of claim 1, wherein:
the adhesive of the first gasket layer comprises a UV curable adhesive;
attaching the first gasket web to the first surface of the membrane web comprises attaching the first gasket web to the first surface of the membrane web via the UV curable adhesive of the first gasket layer using bonding rollers and a UV source;
the adhesive of the second gasket layer comprises a UV curable adhesive; and
attaching the second gasket web to the second surface of the membrane web comprises attaching the second gasket web to the second surface of the membrane web via the UV curable adhesive of the second gasket layer using the bonding rollers and a the UV source.

16. The method of claim 1, wherein the first gasket web is transported to the bonding station on a first conveyer and the second gasket web is transported to the bonding station on a second conveyer and wherein at least one of the first and second conveyers comprises a vacuum belt, a roller, or a carrier web.

17. The method of claim 1, wherein at least one of the first gasket web, the second gasket web, and the membrane web is transported a vacuum conveyor.

18. The method of claim 1, wherein cutting spaced apart apertures in one or both of the first gasket web and the second gasket web comprises cutting the spaced apart apertures using a vacuum rotary die, the vacuum rotary die facilitating removal of aperture slugs.

19. The method of claim 18 additionally comprising the step of transporting aperture slugs to an aperture slug collection tray.

20. A method of making a half gasketed membrane web in a roll to roll process, comprising:
cutting spaced apart apertures in a gasket web, the gasket web comprising a gasket layer having an adhesive;
transporting the gasket web having spaced apart apertures to a bonding station;
transporting a membrane web comprising at least an electrolyte membrane to the bonding station; and
at the bonding station, attaching the gasket web to a surface of the membrane web via the adhesive of the gasket layer, wherein attaching the gasket web to the membrane web comprises attaching the gasket web to the membrane web so that the electrolyte membrane does not extend to the edge of the gasket web in a cross web direction, but does extend to the edge of the gasket web in the down web direction.

21. The method of claim 20, further comprising placing catalyst layers on the membrane web before or after attaching the gasket web to the membrane web.

22. The method of claim 20, wherein:
the adhesive of the gasket layer comprises a pressure sensitive adhesive; and
attaching the gasket web to the surface of the membrane web comprises attaching the gasket web to the surface of the membrane web via the pressure sensitive adhesive of the gasket layer using bonding rollers.

23. The method of claim 20, wherein:
the adhesive of the gasket layer comprises a heat activated adhesive;
attaching the gasket web to the surface of the membrane web comprises attaching the gasket web to the surface of the membrane web via the heat activated adhesive of the gasket layer using heated bonding rollers.

24. The method of claim 20, wherein:
the adhesive of the gasket layer comprises a UV curable adhesive; and
attaching the gasket web to the first surface of the membrane web comprises attaching the gasket web to the surface of the membrane web via the UV curable adhesive of the gasket layer using bonding rollers and a UV source.

25. The method of claim 20, further comprising:
attaching first gas diffusion layers over active areas of the gasketed membrane web; and
attaching second gas diffusion layers over active areas of the gasketed membrane web.

* * * * *